United States Patent [19]

Evens

[11] 3,984,323
[45] Oct. 5, 1976

[54] APPARATUS FOR PURIFYING POLLUTED WATER

[76] Inventor: Frans Evens, Karel Van de Woestijnelei 25, 2200 Borgerhout, Belgium

[22] Filed: May 20, 1975

[21] Appl. No.: 579,274

[30] Foreign Application Priority Data
Sept. 11, 1974 Belgium ............................ 253856

[52] U.S. Cl. .............................. 210/220; 261/122; 261/123; 261/DIG. 75
[51] Int. Cl.² ...................... B01F 3/04; C02C 1/12
[58] Field of Search ................ 210/63, 220, 221 R, 210/242 A; 261/77, 122, 123, DIG. 75

[56] References Cited
UNITED STATES PATENTS

| 950,999 | 3/1910 | Erlwein et al. | 261/DIG. 75 |
| 1,100,036 | 6/1914 | Thumm | 261/77 |
| 2,559,864 | 7/1951 | Firth | 261/123 X |
| 2,733,056 | 1/1956 | Marky | 261/123 X |
| 3,224,170 | 12/1965 | Iwanaga et al. | 261/123 X |
| 3,414,248 | 12/1968 | Iwanaga et al. | 261/123 X |
| 3,829,070 | 8/1974 | Reba et al. | 261/77 |

FOREIGN PATENTS OR APPLICATIONS

| 676,663 | 5/1939 | Germany | 261/123 |

Primary Examiner—Thomas G. Wyse
Assistant Examiner—Robert H. Spitzer
Attorney, Agent, or Firm—Bacon & Thomas

[57] ABSTRACT

The invention pertains to an apparatus for purifying polluted water, which comprises the combination of a screen to be immersed into the water, means for generating a water jet under said screen with respect to the water level, and means for injecting atmospheric air in said water jet.

7 Claims, 3 Drawing Figures

APPARATUS FOR PURIFYING POLLUTED WATER

This invention relates to an apparatus for purifying polluted water in situ.

It is well known that the aeration of impure water has a double effect, namely: the multiplication of aerobic microorganisms having a metabolic activity and the oxidation of determined undesired materials which are dissolved or suspended in water, thereby resulting in the purification of the treated water.

Heretofore, the aeration is essentially carried out by projecting water into the air, by bubbling air in water or by allowing water to flow on and/or through determined surfaces or substrates.

In order to be efficient, these known aeration methods require relatively much energy as well as large plants, so that they are expensive.

On the other hand, the purification process is generally restricted as regards the occupied space, the duration and the specificity of the living organisms.

The object of the present invention is to provide an economic solution to the problem of the purification of polluted water in situ, the purification processes being additionally not restricted neither in the space, nor in the duration, nor by the specificity of the living organisms.

For this purpose, there is suggested an apparatus comprising substantially the combination of a screen being immerged into the water being treated, means for generating a water jet under said screen relative to the water level, and means for injecting atmospheric air in said water jet.

According to a preferred embodiment of this invention, the said screen comprises substantially a porous wall or a mesh work.

The said screen may have various shapes; good results have been obtained with a sleeve shape, the water jet being then produced within the sleeve and in the longitudinal direction thereof.

The characteristics and features of this invention will be more apparent when reading the following description, reference being made to the enclosed drawings in which.

Figure 1:
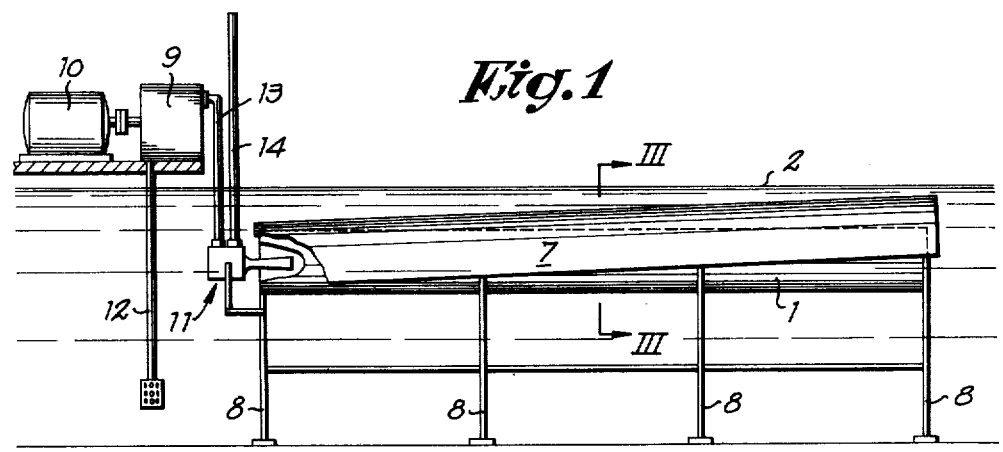
FIG. 1 is a diagrammatic side view of an apparatus according to this invention.
Figure 2:
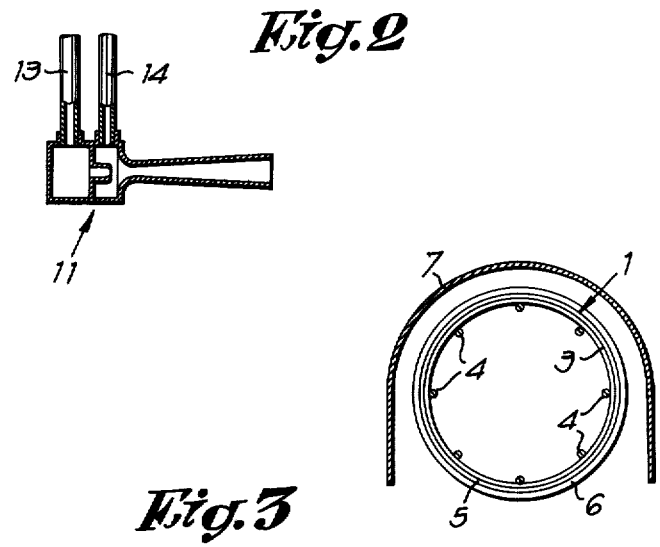
FIG. 2 is a diagrammatic longitudinal section of the jet pump of the apparatus shown in FIG. 1.
Figure 3:
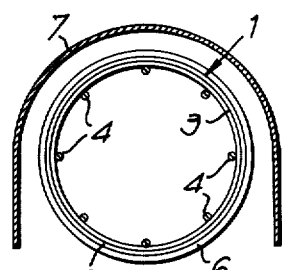
FIG. 3 is a cross section on the line III—III of FIG. 1.

As shown in FIG. 1, an apparatus according to this invention comprises a screen 1 being immerged under the water level 2. In this embodiment, the screen has the shape of a cylindrical sleeve. It comprises a frame formed by a series of rings 3 interconnected by longitudinal members 4 (FIG. 3), said frame being covered with a fine mesh work 5.

The term "fine mesh work" means, e.g. a network with meshes of about 0.5 mm. In order to protect this mesh work, it may be covered with a network 6 having meshes of about 20 mm.

The top of the screen 1 is provided with a cap 7 made of an air-tight material, preferably of a corrugated plate the corrugations of which are extending in the longitudinal direction. Said both elements may be supported and fastened by means of a clamping apparatus or a frame 8, so that the cap 7 has a slope, e.g. of 4° relative to the water level 2.

Polluted water is lead through pipes 12 and 13 to a jet pump 11 by means of a pump 9 driven by a motor 10. The jet pump or ejector 11 suctions air through pipe 14, thereby generating a jet of water admixed with air in the sleeve 1.

The screen or sleeve 1 has a triple function: it protects the sides against water jet, it extends the dwell period of air in water and it forms a substrate for living organisms.

The cap 7 leads progressively the gas bubbles escaping through the screen 1 to the water level 2, thereby causing a second water flow promoting the aeration of the water. The cap 7 forms also a substrate for the living organisms.

The length of the screen 1 or cap 7 is substantially selected in accordance with the throughput of the ejector 11; preferably, the said length will be practically and substantially equal to the length of the sensible water jet leaving the ejector 11 when the latter is immerged to the desired depth in water.

The volume ratio water/air of the mixture formed by the ejector 11 is not critical. Good results may be expected with values between 0.45 and 1.2, said values having however no limitative signification.

An apparatus according to this invention may be independently constructed or it may form part of a ship or a vehicle.

In addition, it is apparent that besides air, other products may be injected in the said water jet.

Thus, the atmospheric air suctioned by the compressor-ejector nozzle and mixed with the polluted water may be completed either with gaseous or liquid mixtures of chemical materials in order to influence the pH or to form specific chemical compounds or complexes in the treated water, or with pure oxygen or with ozone in not sterilizing amounts in order to promote the chemical oxidation processes in the treated water.

The quantitative activity and most probably the qualitative activity of the living organisms in the treated water may be substantially increased by locating or suspending large surfaces of substrates in water. The most various water-resisting and not toxic materials may be used as substrates (nylon material).

What I claim is:

1. Apparatus for purifying a body of polluted water comprising: jet pump means in the polluted water for generating a jet of the polluted water below the surface thereof and directed substantially parallel to the surface of the polluted water; means for including at least air into said jet pump; an elongated, substantially tubular shaped screen means in said polluted water and extending in the direction of discharge of the jet; said screen means being open at least at one end thereof, the discharge of the jet generating means being directed into the screen means adjacent said one open end thereof, the length of said screen means in the direction of said jet being at least equal to the sensible length of the jet in the polluted water at the chosen depth therein; and an air-tight cap in said polluted water disposed above said screen means located at a distance therefrom and slanting slightly upwards in the direction of the jet discharge, said cap enclosing at least the upper half of the screen means.

2. Apparatus according to claim 1, wherein said screen is cylindrical in shape and open at both ends, said water jet being generated coaxially therewith.

3. Apparatus according to claim 2, wherein said cap is generally semi-cylindrical in shape.

4. Apparatus according to claim 3 wherein said screen means comprises an inner member and an outer member, the inner member being of finer mesh work than the outer member.

5. Apparatus according to claim 4 wherein the meshes of the inner member are about 0.5mm. and the meshes of the outer member are about 20mm.

6. Apparatus according to claim 3 wherein said cap is corrugated in the direction of the jet discharge.

7. Apparatus according to claim 2 wherein said screen means is disposed substantially parallel with the surface of the polluted water.

* * * * *